(12) United States Patent
Molinari

(10) Patent No.: US 12,086,136 B2
(45) Date of Patent: Sep. 10, 2024

(54) TECHNIQUES FOR EXECUTING JOIN OPERATIONS USING BITMAP INDICES

(71) Applicant: DISNEY ENTERPRISES, INC., Burbank, CA (US)

(72) Inventor: Guy Molinari, Shelton, WA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 279 days.

(21) Appl. No.: 16/782,025

(22) Filed: Feb. 4, 2020

(65) Prior Publication Data
US 2021/0240708 A1 Aug. 5, 2021

(51) Int. Cl.
G06F 16/2453 (2019.01)
G06F 16/22 (2019.01)
G06F 16/2455 (2019.01)

(52) U.S. Cl.
CPC .... G06F 16/24537 (2019.01); G06F 16/2237 (2019.01); G06F 16/24532 (2019.01); G06F 16/24544 (2019.01); G06F 16/2456 (2019.01)

(58) Field of Classification Search
CPC .......................... G06F 16/2237; G06F 16/2456
See application file for complete search history.

(56) References Cited

U.S. PATENT DOCUMENTS

| | | | | |
|---|---|---|---|---|
| 5,987,453 A * | 11/1999 | Krishna | ............ | G06F 16/24561 |
| 6,801,915 B1 * | 10/2004 | Mack | .................. | G06F 16/2365 |
| | | | | 707/999.102 |
| 2004/0139235 A1 * | 7/2004 | Rashid | ...................... | H04L 9/40 |
| | | | | 707/999.203 |
| 2004/0172400 A1 * | 9/2004 | Zarom | .................. | G06F 16/284 |
| 2012/0209873 A1 * | 8/2012 | He | ...................... | G06F 16/2237 |
| | | | | 707/769 |
| 2013/0117255 A1 * | 5/2013 | Liu | ..................... | G06F 16/2456 |
| | | | | 707/E17.017 |
| 2013/0275364 A1 * | 10/2013 | Wang | .................... | G06F 16/283 |
| | | | | 707/E17.014 |

(Continued)

OTHER PUBLICATIONS

Mannelly, John; "Explaining the Inplace Parameter for Beginners"; Sep. 19, 2019; https://jman4190.medium.com/explaining-the-inplace-parameter-for-beginners-5de7ffa18d2e (Year: 2019).*

(Continued)

*Primary Examiner* — Amanda L Willis
(74) *Attorney, Agent, or Firm* — Artegis Law Group, LLP

(57) ABSTRACT

A database engine uses bitmap slice indices (BSIs) to combine result bitmaps derived from parent and child tables related via one or more foreign key relationships. To execute a query that involves a parent table and a child table, the database engine parses the query into a parent predicate corresponding to the parent table and a child predicate corresponding to the child table. The database engine executes the parent predicate using a parent bitmap index to generate a parent result bitmap and executes the child predicate using a child bitmap index to generate a child result bitmap. The database engine transforms the child result bitmap, based on the BSI, to generate a transformed child result bitmap having columns that correspond to the primary key of the parent table. The database engine can then combine the parent result bitmap directly with the transformed child result bitmap to generate query results.

20 Claims, 9 Drawing Sheets

(56) References Cited

U.S. PATENT DOCUMENTS

| | | | | |
|---|---|---|---|---|
| 2013/0275365 | A1* | 10/2013 | Wang | G06F 16/283 |
| | | | | 707/E17.014 |
| 2013/0282650 | A1* | 10/2013 | Zhang | G06F 16/283 |
| | | | | 707/E17.056 |
| 2020/0334218 | A1* | 10/2020 | Xie | G06F 16/2237 |

OTHER PUBLICATIONS

Chawla, Avi; "A Simple Guide to Inplace Operations in Pandas"; Aug. 21, 2022; https://towardsdatascience.com/a-simple-guide-to-inplace-operations-in-pandas-7a1d97ecce24 (Year: 2022).*

* cited by examiner

400

| USER_ID | GENDER | AGE |
|---|---|---|
| 1919 | FEMALE | 23 |
| 2940 | MALE | 25 |
| 4294 | FEMALE | 32 |
| 6242 | FEMALE | 29 |

410

| GENDER \ USER_ID | 4919 | 2940 | 1294 | 9242 |
|---|---|---|---|---|
| MALE | 0 | 1 | 0 | 0 |
| FEMALE | 1 | 0 | 1 | 1 |
| UNKNOWN | 0 | 0 | 0 | 0 |

| USER_ID | TIMESTAMP | BROWSER | URL |
|---------|-----------|---------|------|
| 4294 | 85200 | C | WWW1 |
| 1919 | 85204 | B | WWW2 |
| 6242 | 85212 | C | WWW3 |
| 2940 | 85226 | A | WWW4 |

510

| TIMESTAMP / BROWSER | 85200 | 85204 | 85212 | 85226 |
|---|---|---|---|---|
| A | 0 | 0 | 0 | 1 |
| B | 0 | 1 | 0 | 0 |
| C | 1 | 0 | 1 | 0 |

FIG. 5

| USER_ID / GENDER | 1919 | 2940 | 4294 | 6242 |
|---|---|---|---|---|
| FEMALE | 1 | 0 | 1 | 1 |

610

| USER_ID / BROWSER | 1919 | 2940 | 4294 | 6242 |
|---|---|---|---|---|
| C | 0 | 0 | 1 | 1 |

710

↓ 230

| USER_ID / GENDER /BROWSER | 1919 | 2940 | 4294 | 6242 |
|---|---|---|---|---|
| FEMALE / C | 0 | 0 | 1 | 1 |

TECHNIQUES FOR EXECUTING JOIN OPERATIONS USING BITMAP INDICES

BACKGROUND

Field of the Various Embodiments

The various embodiments relate generally to relational databases and structured query language execution and, more specifically, to techniques for executing join operations using bitmap indices.

Description of the Related Art

A relational database typically includes a set of tables where different types of data records can be stored. The organizational structure of the set of tables is usually defined by a schema that describes, for each table, one or more fields where data values can be stored and the data types associated with those data values. For example, suppose that a given relational database were to store data records related to authors. A schema associated with the relational database could define an "author" table. The "author" table could store "author" data records that include a "name" field and a "birthdate" field. For a given "author" data record, the "name" field would store a character string corresponding to the name of an author, and the "birthplace" field would store a character string corresponding to the birthplace of that author. Each "author" data record also would include an automatically-assigned primary key value to serve as a unique identifier for that data record.

In addition to the set of tables discussed above, a relational database typically includes a query processor that executes queries written in structured query language (SQL). The query processor executes such queries to locate and extract data records from the set of tables included in the relational database. A given query usually defines one or more tables from which data records should be extracted and one or more conditions that a data record should meet in order to qualify for extraction. Returning to the above example, suppose a given query were to indicate that all "author" data records should be returned from the "author" table where the "birthplace" field stores the character string "London." To execute this query, the query processor would scan the "author" table and compare the character string "London" to the "birthplace" field of each "author" data record. The query processor would collect any data record having a "birthplace" field that matches the character string "London" to produce a set of query results.

As a general matter, query execution time can vary between different queries and different tables. One factor that increases query execution time is the complexity of any comparison operations that need to be performed to identify data records included in a given table that meet the conditions set forth in the query. Referring again to the above example, comparing the character string "London" to any given "birthplace" field would implicitly require several individual comparison operations to be performed to determine whether each character in "London" matched each character included in a given "birthplace" field.

One approach to reducing query execution time for a particular table is to generate a bitmap index that delineates a fixed set of possible values that a given field of any data record in the table can have. Further, for each data record and each possible value, the bitmap index stores a bit that indicates whether the given field of the data record stores the value. Referring again to the above example, a bitmap index generated for the "author" table could delineate a fixed set of possible birthplaces, and then store, for a given birthplace, a "1" to indicate the particular "author" data records that are associated with that given birthplace. During query execution, the query processor can scan the bitmap index relatively quickly to locate and extract data records having a specific value for a given field, thereby reducing the number of needed comparison operations and accelerating overall query execution.

One shortcoming of using bitmap indices to accelerate query execution is that bitmap indices cannot directly be used to accelerate the execution of queries that involve JOIN operations between two or more tables. In particular, a given bitmap index associated with a given table typically has a format that is incompatible with the format of other bitmap indices associated with other tables. Consequently, intermediate query results generated based on one bitmap index typically cannot be combined with intermediate query results generated based on other bitmap indices. As a result, queries across multiple tables typically execute much more slowly compared to other types of queries because bitmap indices cannot be implemented to accelerate query execution. Slow query execution is especially problematic with user-facing software applications, such as websites or streaming video services, that provide users with data that is extracted from a relational database. In particular, a given user-facing software application can appear sluggish and unresponsive to users while waiting for a given query to finish executing, thereby leading to a poor user experience.

As the foregoing illustrates, what is needed in the art is a more effective approach for executing queries across multiple tables in a relational database.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 4 illustrates an exemplary set of data records and a corresponding bitmap index associated with the user table of FIG. 3, according to various embodiments;

FIG. 5 illustrates an exemplary set of data records and a corresponding bitmap index associated with the activity table of FIG. 3, according to various embodiments;

FIG. 8 illustrates how the database engine of FIG. 1 combines different result bitmaps to generate query results, according to various embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

To address one or more shortcomings of the prior art, various embodiments include a database engine that uses bitmap slice indices (BSIs) to combine result bitmaps derived from parent and child tables that are related to one another via one or more foreign key relationships. To execute a query that involves a parent table and a child table, the database engine parses the query into a parent predicate corresponding to the parent table and a child predicate corresponding to the child table. The database engine executes the parent predicate using a parent bitmap index to generate a parent result bitmap and executes the child predicate using a child bitmap index to generate a child result bitmap. The parent result bitmap and the child result bitmap have columns derived from different primary keys associated with the parent table and the child table, respectively, and therefore cannot be directly combined with one another. The database engine aligns the columns of the parent result bitmap and the child result bitmap using a BSI that relates the primary key of the child table to the primary key of the parent table. In particular, the database engine transforms the child result bitmap, based on the BSI, to generate a transformed child result bitmap having columns that correspond to the primary key of the parent table. The database engine can then combine the parent result bitmap directly with the transformed child result bitmap to generate query results. In various other embodiments, encoding schemes other than BSIs may be implemented to perform the inventive techniques.

At least one technical advantage of the disclosed techniques relative to the prior art is that the disclosed techniques enable the execution of complex queries involving JOIN operations across multiple different tables in a relational database to be accelerated. Thus, with the disclosed techniques, complex queries typically can be executed substantially faster than what is possible with conventional techniques. Accordingly, when user-facing applications that typically execute numerous complex query operations across different tables in relational databases during normal operation are implemented with the disclosed techniques, those applications are able to operate with lower-latency and more responsiveness, thereby providing an overall better user experience. These technical advantages represent one or more technological advancements over prior art approaches.

System Overview

Figure 1:
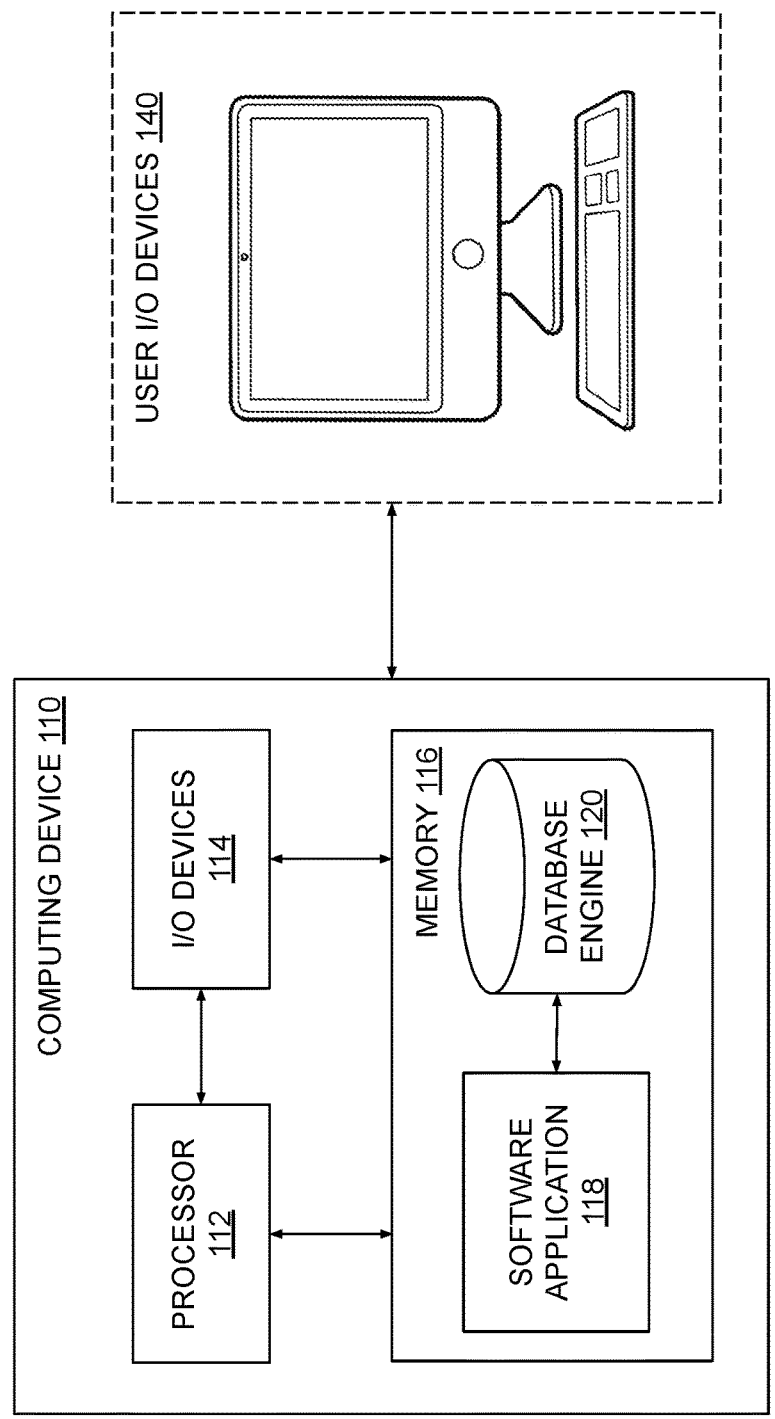
FIG. 1 illustrates a system configured to implement one or more aspects of the various embodiments.

FIG. 1 illustrates a system configured to implement one or more aspects of the various embodiments. As shown, a system 100 includes a computing device 110 coupled to user input/output (I/O) devices 140. Computing device 110 may be any technically feasible type of computer system, including a desktop computer, a laptop computer, a mobile device, a virtualized instance of a computing device, a distributed or cloud-based computer system, and so forth. User I/O devices 140 may include any technically feasible device configured to receive input from a user, provide output to a user, or both, including a keyboard, a mouse, a display device, a touchscreen, and so forth.

Computing device 110 includes a processor 112, input/output (I/O) devices 114, and a memory 116, coupled together. Processor 112 may include any technically feasible set of hardware units configured to process data and execute software applications. For example, processor 112 could include one or more central processing units (CPUs) or one or more graphics processing units (GPUs). I/O devices 114 may include any technically feasible set of hardware devices configured to perform input operations, output operations, or both types of operations on behalf of processor 112 and memory 116, including, for example, a universal serial bus (USB) port, a serial port, and so forth. Memory 116 may include any technically feasible storage media configured to store data and software applications, such as, for example, a hard disk, a random-access memory (RAM) module, and a read-only memory (ROM). Memory 116 includes a software application 118 and a database engine 120.

Software application 118 includes program code that, when executed by processor 112, issues structured query language (SQL) queries to database engine 120. Database engine 120 is a relational database that stores a set of tables. Each table is defined according to a schema and is configured to store data records. The schema describes various fields and corresponding data types for the data records stored in the table. The schema also defines various types of logical relationships between tables, including foreign key relationships, many-to-many relationships, and so forth. Database engine 120 executes SQL queries received from software application 118 to provide software application 118 with selected subsets of data records. In various other embodiments, any other approach to representing queries and/or query predicates other than SQL may be implemented when performing the inventive techniques.

A given SQL query can take the form of a SELECT statement indicating one or more tables from which data records should be extracted. A given SQL query can optionally indicate one or more conditional statements specifying one or more criteria any returned data records should meet. In some instances, a given SQL query issued by software application 118 indicates, either explicitly or implicitly, that a JOIN operation should be performed between two or more tables. If the two or more tables are indexed appropriately, then database engine 120 can perform a sequence of operations to accelerate execution of that SQL query. These operations are described in greater detail below in conjunction with FIGS. 2-9.

Software Overview

Figure 2:
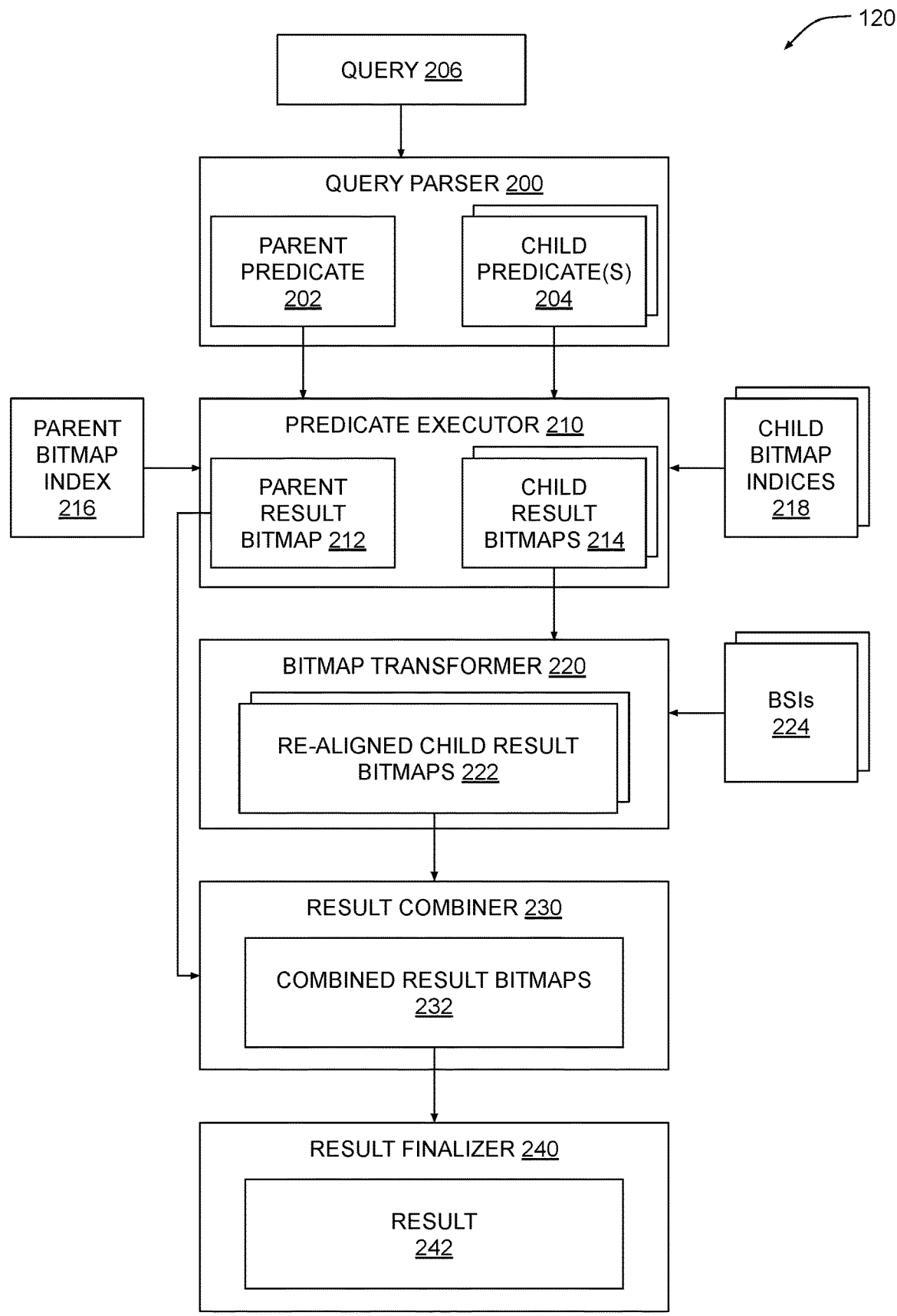
FIG. 2 is a more detailed illustration of the database engine of FIG. 1, according to various embodiments.

FIG. 2 is a more detailed illustration of the database engine of FIG. 1, according to various embodiments. As shown, database engine 120 includes query parser 200, predicate executor 210, bitmap transformer 220, result combiner 230, and result finalizer 240.

In operation, query parser 200 generates a parent predicate 202 and one or more child predicates 204 based on a query 206 received from software application 118. Query 206 generally includes a SQL expression that specifies data or metadata to be derived from two or more tables that need to be combined during query execution via one or more JOIN operations. Parent predicate 202 includes portions of query 206 that specify one or more conditions on a parent table. Child predicate(s) 204 include portions of query 206 that specify one or more conditions on one or more child tables that have a foreign key relationship to the parent table.

Predicate executor 210 executes parent predicate 202 and child predicate(s) 204 in parallel to generate parent result bitmap 212 and child result bitmap(s) 214 using parent bitmap index 216 and one or more child bitmap indices 218, respectively. Parent bitmap index 216 is a standard bitmap index that delineates a set of possible values a specific field within the parent table can assume. Parent bitmap index 216 also indicates, for each data record in the parent table and each possible value for the specific field, a binary bit indicating whether the specific field of the data record stores the corresponding value. Similarly, each child bitmap index 218 is a standard bitmap index that delineates a set of possible values a particular field within a corresponding child table can assume. A given child bitmap index 218 also indicates, for each data record in the corresponding child table and each possible value for the particular field, a bit indicating whether the particular field of the data record stores the corresponding value.

Parent result bitmap 212 is a standard bitmap that indicates records of the parent table that meet the condition(s) set forth in parent predicate 202. Likewise, each child result bitmap 214 is a standard bitmap that indicates records of the corresponding child table that meet the condition(s) set forth in the corresponding child predicate 202. In order to produce query results, the intersection between parent result bitmap 212 and child result bitmap(s) 214 needs to be computed to identify all data records that meet the conditions set forth in both parent predicate 202 and child predicate(s) 204. However, parent result bitmap 212 is defined based on the primary key of the parent table and each child result bitmap 214 is defined based on the primary key of the corresponding child table. Consequently, parent result bitmap 212 and child result bitmap(s) 214 cannot be directly combined to produce query results.

Bitmap transformer 220 addresses this issue by performing a transformation operation with child result bitmap(s) 214 to align the columns of those child result bitmaps with the columns of parent result bitmap 212. For a given child result bitmap 214, bitmap transformer 220 performs this transformation using a corresponding bitmap slice index (BSI) 224 generated for the corresponding child table. The corresponding BSI 224 relates the primary key associated with the given child result bitmap 214 to the primary key of the parent table. Bitmap transformer 220 iterates through the given child result bitmap 214 and, for each data record where the corresponding binary bit is set, transforms a primary key value associated with that data record, via the corresponding BSI 224, to a primary key value associated with the parent table. In this manner, bitmap transformer 220 generates transformed child result bitmaps 222.

Result combiner 230 obtains parent result bitmap 212 and transformed child result bitmap(s) 222 and combines these bitmaps to generate combined result bitmap 232. Combined result bitmap 232 includes columns corresponding to the primary key of the parent table. Combined result bitmap 232 also includes a binary bit for each primary key value indicating whether the corresponding data record meets all conditions set forth in query 206.

Result finalizer 240 performs one or more operations with combined result bitmap 232 to generate results 242. Result finalizer 240 may perform aggregate operations, such as summation or cardinality operations, to generate metadata based on combined result bitmap 232. Alternatively, result finalizer 240 can extract the set of data records indicated in combined result bitmap 242 from the parent table and output those data records.

Advantageously, the techniques described above allow JOIN operations to be performed across tables related via foreign key relationships and indexed with bitmap indices. Accordingly, the disclosed techniques allow certain types of queries to be executed faster than possible with conventional techniques, thereby enabling software applications that rely on fast query execution to operate with low latency. Persons skilled in the art will understand how the inventive techniques can be implemented using any technically feasible encoding scheme other than BSIs and any technically feasible query language other than SQL. For example, a given BSI discussed herein could be replaced with any data structure capable of representing high-dimensionality values. Similarly, a given query discussed herein could be replaced with any expression that represents one or more predicates. FIGS. 3-8 set forth examples of the various data and operations described thus far.

Exemplary Query Execution Using Bitmap Slice Indices

FIGS. 3-8 set forth an example of how database engine 120 of FIG. 1 executes a query involving a JOIN operation between a parent table and a child table that are related to one another via a foreign key relationship, according to various embodiments. In the example that follows, the parent table stores data records related to a set of users, and the child table stores data records related to online activity of those users. The various fields included in these tables can store any technically feasible type of value, including integer values, binary values, character values, and so forth. Further, any such value can readily be converted to any other technically feasible type of value during the course of the operations discussed below. Persons skilled in the art will understand how the techniques described herein can be applied to execute a wide variety of different queries of varying complexity, including those which involve multiple JOIN operations between a parent table and multiple child tables.

Figure 3:
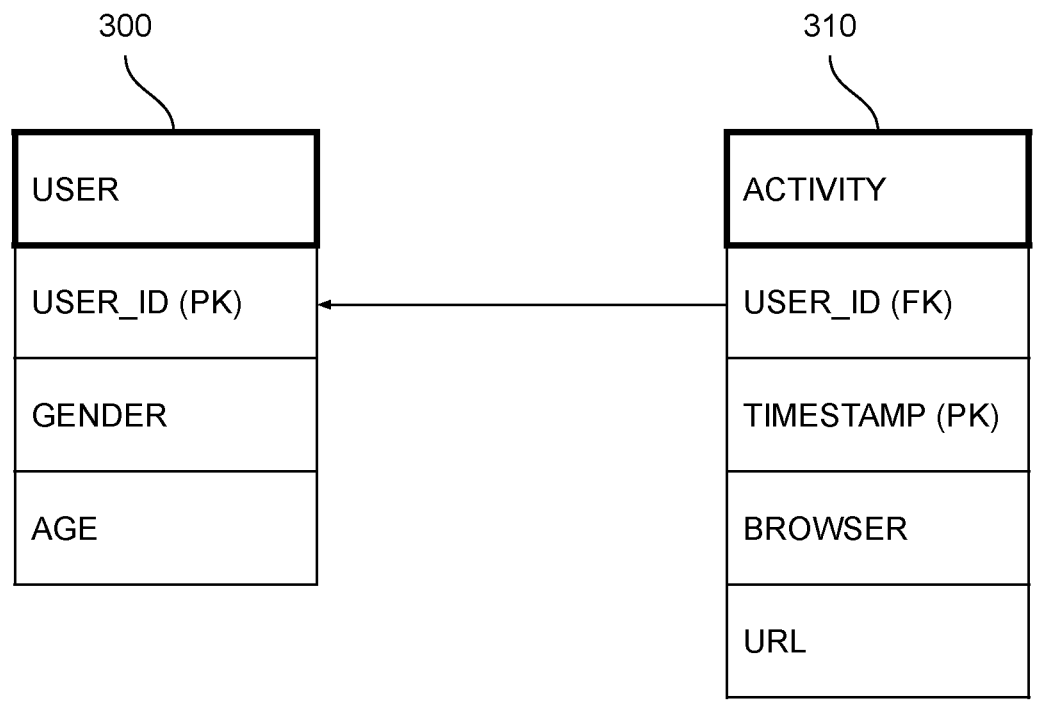
FIG. 3 illustrates an exemplary set of tables that are associated with one another through a foreign key relationship, according to various embodiments.

FIG. 3 illustrates an exemplary set of tables that are associated with one another through a foreign key relationship, according to various embodiments. As shown, a user table 300 includes a set of fields storing various information related to users, including a user_id field, a gender field, and an age field. The user_id field is the primary key of user table 300 and therefore stores a different value for each user data record. The gender field stores the gender of a given user, and the age field stores the age of the given user. An example of user data records that can be stored within user table 300 are shown in FIG. 4, along with a bitmap index associated with user table 300.

As also shown, an activity table 310 includes a set of fields storing various information related to online activity of users, including a user_id field, a timestamp field, a browser field, and a uniform resource locator (URL) field. The user_id field stores a foreign key value derived from user table 300 and therefore corresponds to a particular user data record stored in user table 300. The timestamp field stores a timestamp indicating when a given user associated with the user_id accessed a given URL. The timestamp field is the primary key of activity table 310 and therefore stores a different value for each activity data record. The browser field indicates the type of browser used to access the given URL at the time indicated by the timestamp, and the URL field indicates the given URL that was accessed at that time. An example of activity data records that can be stored within activity table 310 are shown in FIG. 5, along with a bitmap index associated with activity table 310.

FIG. 4 illustrates an exemplary set of data records and a corresponding bitmap index associated with the user table of FIG. 3, according to various embodiments. As shown, user data records 400 include four different data records corresponding to four different users, including a female user (age 23), a male user (age 25), a female user (age 32), and a female user (age 29). Each user data record 400 is associated with a different user_id. As also shown, bitmap index 410 delineates a set of possible values the gender field of each user data record 400 can have, including male, female, and unknown. Bitmap index 410 also indicates, for each user data record 400 and each possible value for the gender field, a binary bit indicating whether the gender field of the data record stores the corresponding value. For example, bitmap index 410 includes a row for "male" having a binary bit indicating that the user data record with user_id equal to 2940 has gender equal to "male." User data records 400 and bitmap index 410 are referred to subsequently below in order to illustrate how database engine 120 performs JOIN operations between user table 300 and activity table 310.

FIG. 5 illustrates an exemplary set of data records and a corresponding bitmap index associated with the activity table of FIG. 3, according to various embodiments. As shown, activity data records 500 include four different data records corresponding to four different instances of online activity. Each activity data record 500 is associated with a user_id indicating the particular user associated with the instance of online activity. Multiple activity data records 500 can be associated with one user, although that is not illustrated here. As also shown, bitmap index 510 delineates a set of possible values the browser field of each activity data record 500 can have, including browsers A, B, and C. Bitmap index 510 also indicates, for each activity data record 500 and each possible value for the browser field, a binary bit indicating whether the browser field of the data record stores the corresponding value. For example, bitmap index 510 includes a row for browser "A" having a binary bit indicating that the activity data record with timestamp equal to 85226 has browser equal to "A." Activity data records 500 and bitmap index 510 are referred to subsequently below in order to illustrate how database engine 120 performs JOIN operations between user table 300 and activity table 310.

Figure 6:
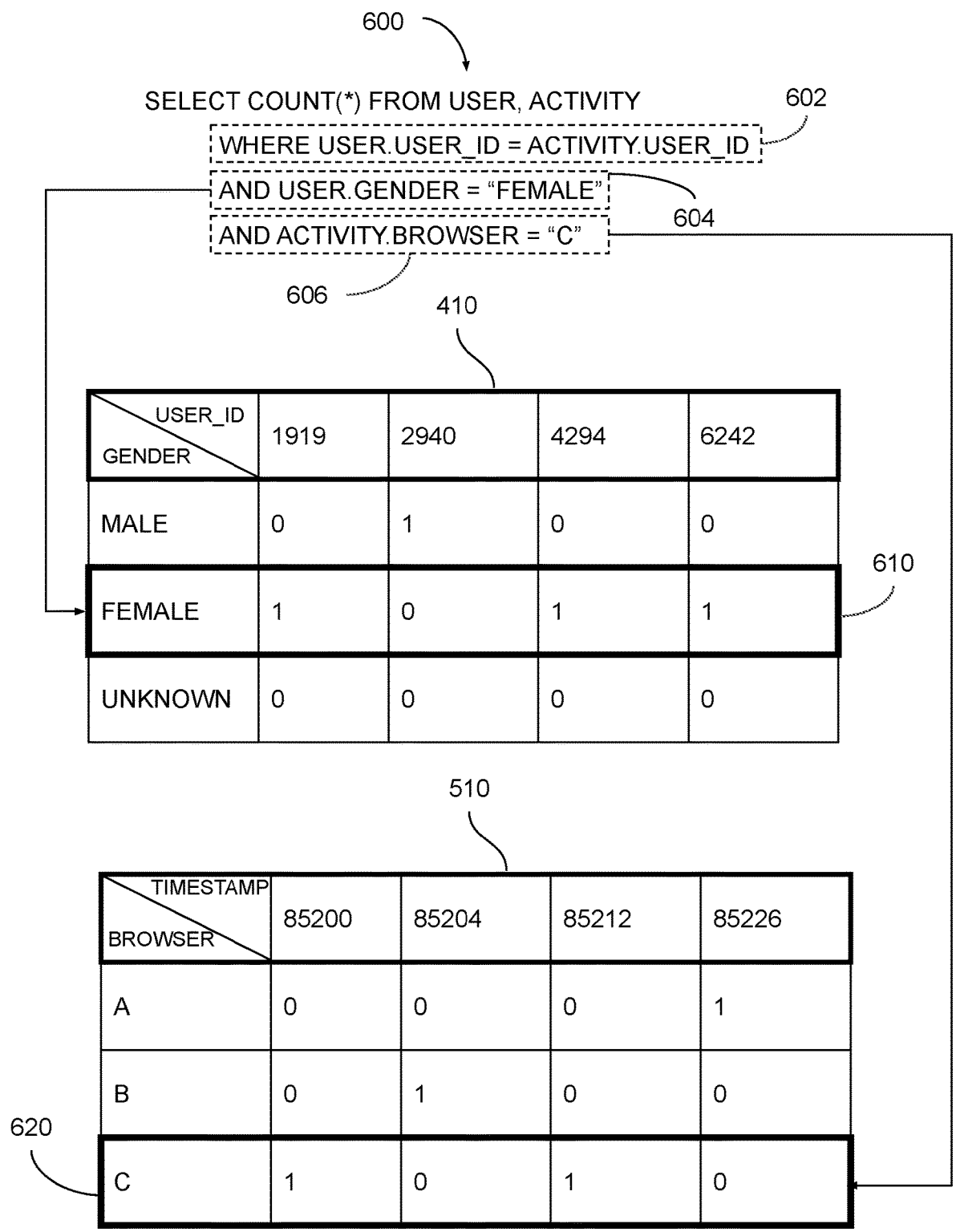
FIG. 6 illustrates how the database engine of FIG. 1 executes an exemplary query using the bitmap indices of FIGS. 4-5, according to various embodiments.

FIG. 6 illustrates how the database engine of FIG. 1 executes an exemplary query using the bitmap indices of FIGS. 4-5, according to various embodiments. As shown, query 600 indicates that a count operation should be performed to determine the number of data records that result when user table 300 is filtered to obtain all user data records 400 with gender equal to "female," activity table 310 is filtered to obtain all activity data records 500 with browser equal to "C," and the two resultant sets of data records are combined via JOIN operation using corresponding user_id fields. In query 600, "where" clause 602 indicates the JOIN operation to be performed, parent predicate 604 indicates how user data records 400 should be filtered based on the gender field, and child predicate 606 indicates how activity data records 500 should be filtered based on the browser field.

When database engine 120 executes query 600, query parser 200 first parses query 600 to extract parent predicate 604 and child predicate 606. Predicate executor 210 then executes parent predicate 604 and child predicate 606 in parallel with one another, meaning that predicate executor 210 executes at least a portion of operations associated with parent predicate 604 while simultaneously executing at least a portion of operations associated with child predicate 606. When executing parent predicate 604, predicate executor 210 extracts from bitmap index 410 a parent result bitmap 610 that indicates the specific user data records 400 having gender equal to "female." When executing child predicate 606, predicate executor 210 extracts from bitmap index 510 a child result bitmap 620 that indicates the specific activity data records 500 having browser equal to "C." Parent result bitmap 610 and child result bitmap 620 cannot be directly combined because the columns of parent result bitmap 610 are primary key values derived from user data records 400, as is shown, while the columns of child result bitmap 620 are primary key values derived from activity data records 500, as also shown. This issue can be addressed using a BSI associated with activity table 310 to transform the columns of child result bitmap 620.

Figure 7:
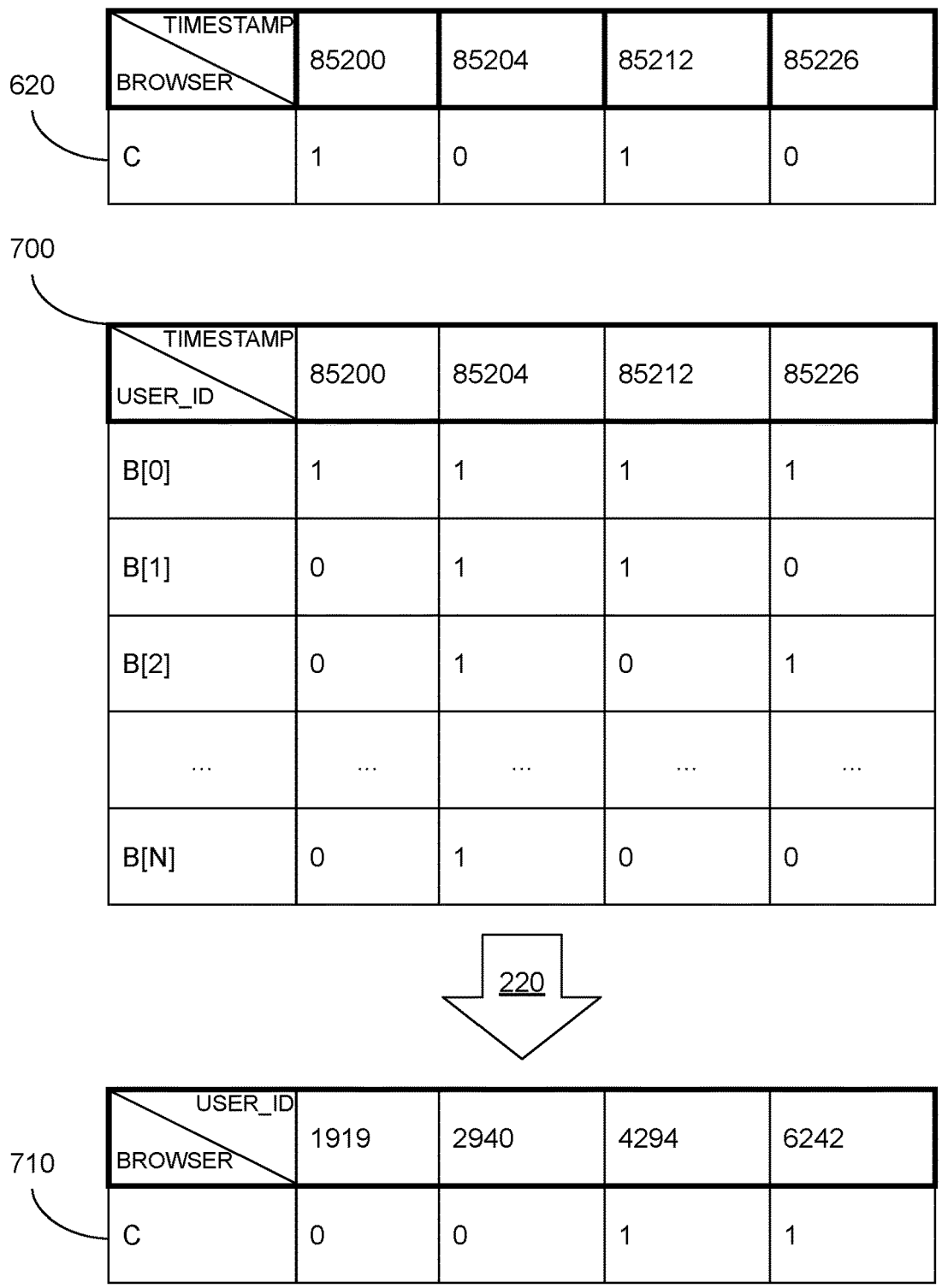
FIG. 7 illustrates how the database engine of FIG. 1 transforms the column indices of one of the result bitmaps of FIG. 6, according to various embodiments.

FIG. 7 illustrates how the database engine of FIG. 1 transforms the column indices of the child result bitmap of FIG. 6, according to various embodiments. As shown, BSI 700 includes columns corresponding to timestamps derived from activity data records 500. BSI 700 also includes rows corresponding user_ids of user data records 400. In particular, each row of BSI 700 corresponds to a different bit position associated with a binary representation of any given user_id. As is shown, BSI 700 includes rows B[0] through B[N] corresponding to N+1 different binary positions associated with any given user_id. Each cell of BSI 700 indicates, for a given timestamp, the binary values included within a binary representation of the user_id associated with that timestamp. For example, the column of BSI 700 associated with timestamp 85200 includes binary values B[0]=1, B[1]=0, B[2]=0, and so forth, where those binary values are derived from a binary representation of user_id 4294. BSI 700 thus represents a mapping between the primary key of user table 300 (user_ids) and the primary key of activity table 310 (timestamps).

Bitmap transformer 220 uses BSI 700 to transform child result bitmap 620 so that the columns of child result bitmap 620 are user_ids instead of timestamps, thereby generating transformed result bitmap 710. Transformed result bitmap 710 indicates the user_ids of users with an activity data record 500 where the browser field equals "C." To generate transformed result bitmap 710, bitmap transformer 220 iterates through child result bitmap 620 and, for each timestamp where the corresponding binary bit is set, transforms the timestamp into the corresponding user_id indicated in BSI 700. Both transformed result bitmap 710 and parent result bitmap 610 have columns corresponding to user_ids and can therefore be directly combined with one another.

FIG. 8 illustrates how the database engine of FIG. 1 combines different result bitmaps to generate query results, according to various embodiments. As shown, the columns of parent result bitmap 610 and transformed result bitmap 710 are aligned with one another via corresponding user_ids. Accordingly, result combiner 230 can perform an AND operation between parent result bitmap 610 and transformed result bitmap 710 to generate a combined result bitmap 810. Combined result bitmap 810 indicates user data records 400 where gender is equal to "female" and an activity data record exists for that user where the browser field is equal to "C." Result finalizer 240 executes a count operation across combined result bitmap 810 to determine that the output of executing query 600 is the integer value two.

Referring generally to FIGS. 3-8, the example discussed above is meant to illustrate how database engine 120 can perform JOIN operations between tables related via a foreign key relationship using bitmap indices and bitmap slice indices to facilitate the rapid computation of results. Because the various operations discussed above are performed using binary values, these operations can be performed much faster than conventional techniques.

Procedure for Executing Queries Using Bitmap Slice Indices

Figure 9:
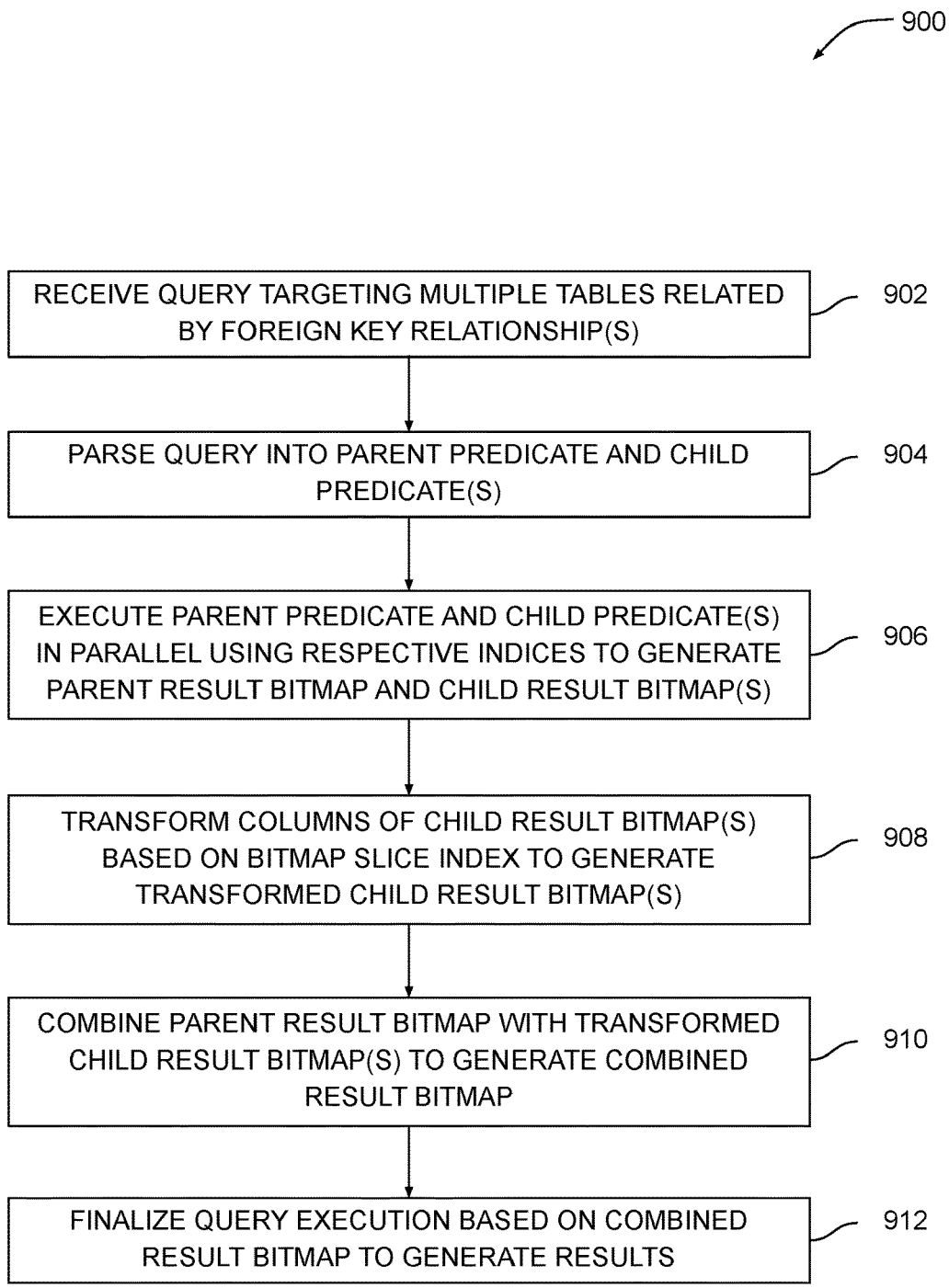
FIG. 9 is a flow diagram for executing a query across different tables in a relational database, according to various embodiments.

FIG. 9 is a flow diagram for executing a query across different tables in a relational database, according to various embodiments. Although the method steps are described in conjunction with the systems of FIGS. 1-8, persons skilled in the art will understand that any system configured to perform the method steps in any order falls within the scope of the present embodiments.

As shown, a method 900 begins at step 902, where query parser 200 within database engine 120 receives a query targeting multiple tables related by foreign key relationship(s). The query received at step 902 generally includes a SQL expression that specifies data or metadata to be derived from the multiple tables that need to be JOINed during query execution. One of those tables is denoted the "parent" table, while the one or more other tables are denoted the "child" table(s). FIG. 3 sets forth an exemplary parent table and child table.

At step 904, query parser 200 parses the query into a parent predicate and a child predicate(s). The parent predicate includes portions of the query that specify one or more conditions on the parent table. The child predicate(s) include portions of the query that specify one or more conditions on one or more child tables that have a foreign key relationship to the parent table. FIG. 6 illustrates an exemplary query and how that query is parsed into parent and child predicates.

At step 906, predicate executor 210 within database engine 120 executes the parent predicate and the child predicate(s) in parallel using respective indices to generate parent result bitmap and child result bitmap(s). In particular, predicate executor 210 uses a parent bitmap index that indicates, for each data record in the parent table and each possible value for a specific field, a binary bit indicating whether the specific field of the data record stores the corresponding value. Similarly, predicate executor 210 uses a child bitmap index that indicates, for each data record in the corresponding child table and each possible value for a particular field, a binary bit indicating whether the particular field of the data record stores the corresponding value. FIGS. 4-5 illustrate exemplary bitmap indices.

At step 908, bitmap transformer 220 within database engine 120 transforms the columns of the child result bitmap(s) based on a BSI to generate transformed child result bitmap(s). For a given child result bitmap, bitmap transformer 220 performs step 908 using a specific BSI generated for the corresponding child table. The BSI relates the primary key of the child table to the primary key of the parent table. Bitmap transformer 220 iterates through the given child result bitmap and, for each data record where the corresponding binary bit is set, transforms a primary key value associated with that data record, via the corresponding BSI, to a primary key value associated with the parent table. In this manner, bitmap transformer 220 generates one or more transformed child result bitmaps. FIG. 7 illustrates how bitmap transformer 220 uses a BSI to perform the transformation operation described above.

At step 910, result combiner 230 within database engine 120 combines the parent result bitmap generated at step 906 with the transformed child result bitmap(s) generated at step 908 to generate a combined result bitmap. The combined result bitmap includes binary bits indicating specific data records of the parent table that meet the conditions set forth in both the parent predicate and the child predicate(s). FIG. 8 illustrates how result combiner 230 combines result bitmaps to generate combined result bitmaps.

At step 912, result finalizer 240 within database engine 120 finalizes query execution based on the combined result bitmap generated at step 910 to generate query results. In doing so, result finalizer 240 may execute an aggregate operation, such as a SUM, COUNT, or AVG operation, to generate metadata related to the set of data records determined at step step 910.

In sum, a database engine uses bitmap slice indices (BSIs) to combine result bitmaps derived from parent and child tables that are related to one another via one or more foreign key relationships. To execute a query that involves a parent table and a child table, the database engine parses the query into a parent predicate corresponding to the parent table and a child predicate corresponding to the child table. The database engine executes the parent predicate using a parent bitmap index to generate a parent result bitmap and executes the child predicate using a child bitmap index to generate a child result bitmap. The parent result bitmap and the child result bitmap have columns derived from different primary keys associated with the parent table and the child table, respectively, and therefore cannot be directly combined with one another. The database engine rectifies the columns of the parent result bitmap and the child result bitmap using a BSI that relates the primary key of the child table to the primary key of the parent table. In particular, the database engine transforms the child result bitmap, based on the BSI, to generate a transformed child result bitmap having columns that correspond to the primary key of the parent table. The database engine can then combine the parent result bitmap directly with the transformed child result bitmap to generate query results.

At least one technical advantage of the disclosed techniques relative to the prior art is that the disclosed techniques enable the execution of complex queries involving JOIN operations across multiple different tables in a relational database to be accelerated. Thus, with the disclosed techniques, complex queries typically can be executed substantially faster than what is possible with conventional techniques. Accordingly, when user-facing applications that typically execute numerous complex query operations across different tables in relational databases during normal operation are implemented with the disclosed techniques, those applications are able to operate with lower-latency and more responsiveness, thereby providing an overall better user experience. These technical advantages represent one or more technological advancements over prior art approaches.

1. Some embodiments include a computer-implemented method for executing a query across different tables included in a database, the method comprising executing a first portion of the query against a first table included in the database to generate a first result bitmap, wherein each bit in the first result bitmap corresponds to a different value included in a first set of values, executing a second portion of the query against a second table included in the database to generate a second result bitmap, wherein each bit of the second result bitmap corresponds to a different value included in a second set of values, generating a third result bitmap based on the second result bitmap and a bit-slice index associated with the second table, wherein each bit of the third result bitmap corresponds to a different value included in the first set of values, and generating at least one query result based on the first result bitmap and the third result bitmap.

2. The computer-implemented method of clause 1, wherein the first portion of the query corresponds to a first condition, and the first result bitmap indicates one or more data records included in the first table that meet the first condition.

3. The computer-implemented method of any of clauses 1-2, wherein the second portion of the query corresponds to a second condition, and the second result bitmap indicates one or more data records included in the second table that meet the second condition.

4. The computer-implemented method of any of clauses 1-3, wherein the first portion of the query is executed at least partially in parallel with the second portion of the query.

5. The computer-implemented method of any of clauses 1-4, wherein a third portion of the query indicates that a JOIN operation should be performed between one or more data records extracted from the first table and one or more data records extracted from the second table.

6. The computer-implemented method of any of clauses 1-5, wherein the first table and the second table are associated with one another via a foreign key relationship.

7. The computer-implemented method of any of clauses 1-6, wherein the bit-slice index comprises a mapping from the second set of values to the first set of values.

8. The computer-implemented method of any of clauses 1-7, wherein the bit-slice index comprises a mapping from each value included in the second set of values to a binary representation of a particular value included in the first set of values.

9. The computer-implemented method of any of clauses 1-8, wherein generating the third result bitmap comprises assigning each bit of the second result bitmap a particular value included in the first set of values.

10. The computer-implemented method of any of clauses 1-9, further comprising executing an AND operation between the first result bitmap and the second result bitmap to generate the at least one query result.

11. Some embodiments include a non-transitory computer-readable medium storing program instructions that, when executed by a processor, cause the processor to execute a query across different tables included in a database by performing the steps of executing a first portion of the query against a first table included in the database to generate a first result bitmap, wherein each bit in the first result bitmap corresponds to a different value included in a first set of values, executing a second portion of the query against a second table included in the database to generate a second result bitmap, wherein each bit of the second result bitmap corresponds to a different value included in a second set of values, generating a third result bitmap based on the second result bitmap and a bit-slice index associated with the second table, wherein each bit of the third result bitmap corresponds to a different value included in the first set of values, and generating at least one query result based on the first result bitmap and the third result bitmap.

12. The non-transitory computer-readable medium of clause 11, wherein the first portion of the query corresponds to a first condition, and the first result bitmap indicates one or more data records included in the first table that meet the first condition.

13. The non-transitory computer-readable medium of any of clauses 11-12, wherein the second portion of the query corresponds to a second condition, and the second result bitmap indicates one or more data records included in the second table that meet the second condition.

14. The non-transitory computer-readable medium of any of clauses 11-13, wherein a third portion of the query indicates that a JOIN operation should be performed between one or more data records extracted from the first table and one or more data records extracted from the second table.

15. The non-transitory computer-readable medium of any of clauses 11-14, wherein the bit-slice index comprises a mapping from the second set of values to the first set of values.

16. The non-transitory computer-readable medium of any of clauses 11-15, wherein the step of generating the third result bitmap comprises assigning each bit of the second result bitmap a particular value included in the first set of values.

17. The non-transitory computer-readable medium of any of clauses 11-16, wherein the step of generating the at least one query result comprises performing an aggregation operation across a combination of the first result bitmap and the second result bitmap.

18. The non-transitory computer-readable medium of any of clauses 11-17, wherein the step of executing the first portion of the query against the first table comprises scanning the first table to identify one or more data records that meet a condition associated with the first portion of the query.

19. The non-transitory computer-readable medium of any of clauses 11-18, wherein the step of executing the second portion of the query against the second table comprises scanning the second table to identify one or more data records that meet a condition associated with the second portion of the query.

20. Some embodiments include a system, comprising a memory storing a software application, and a processor that, when executing the software application, is configured to perform the steps of executing a first portion of the query against a first table included in the database to generate a first result bitmap, wherein each bit in the first result bitmap corresponds to a different value included in a first set of values, executing a second portion of the query against a second table included in the database to generate a second result bitmap, wherein each bit of the second result bitmap corresponds to a different value included in a second set of values, generating a third result bitmap based on the second result bitmap and a bit-slice index associated with the second table, wherein each bit of the third result bitmap corresponds to a different value included in the first set of values, and generating at least one query result based on the first result bitmap and the third result bitmap.

Any and all combinations of any of the claim elements recited in any of the claims or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations, block diagrams of methods, apparatus (systems) and computer program products according to embodiments of the disclosure. It will be understood that each block of the flowchart illustrations, block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for executing a query across different tables included in a database, the method comprising:
   executing a first portion of the query against a first table included in the database to generate a first result bitmap, wherein each bit of the first result bitmap corresponds to a respective first primary key value included in a set of first primary key values associated with the first table;
   executing a second portion of the query against a second table included in the database to generate a second result bitmap, wherein each bit of the second result bitmap corresponds to a respective second primary key value included in a set of second primary key values associated with the second table;
   modifying the second result bitmap based on a bit-slice index associated with the second table to generate a third result bitmap, wherein each bit of the third result bitmap corresponds to one of the first primary key values included in the set of first primary key values, and wherein modifying the second result bitmap comprises transforming, within each data record of the second result bitmap for which a binary bit is set, one of the second primary key values associated with the data record to one of the first primary key values included in the set of first primary key values; and
   generating at least one query result based on the first result bitmap and the third result bitmap.

2. The computer-implemented method of claim 1, wherein the first portion of the query corresponds to a first condition, and the first result bitmap indicates one or more data records included in the first table that meet the first condition.

3. The computer-implemented method of claim 1, wherein the second portion of the query corresponds to a second condition, and the second result bitmap indicates one or more data records included in the second table that meet the second condition.

4. The computer-implemented method of claim 1, wherein the first portion of the query is executed at least partially in parallel with the second portion of the query.

5. The computer-implemented method of claim 1, wherein a third portion of the query indicates that a JOIN operation should be performed between one or more data records extracted from the first table and one or more data records extracted from the second table.

6. The computer-implemented method of claim 1, wherein the first table and the second table are associated with one another via a foreign key relationship.

7. The computer-implemented method of claim 1, wherein the bit-slice index comprises a mapping from the set of second primary key values to the set of first primary key values.

8. The computer-implemented method of claim 1, wherein the bit-slice index comprises a mapping from each second primary key value included in the set of second primary key values to a binary representation of a particular first primary key value included in the set of first primary key values.

9. The computer-implemented method of claim 1, wherein modifying the second result bitmap comprises assigning each bit of the second result bitmap a particular first primary key value included in the set of first primary key values.

10. The computer-implemented method of claim 1, further comprising executing an AND operation between the first result bitmap and the second result bitmap to generate the at least one query result.

11. A non-transitory computer-readable medium storing program instructions that, when executed by a processor, cause the processor to execute a query across different tables included in a database by performing the steps of:
executing a first portion of the query against a first table included in the database to generate a first result bitmap, wherein each bit of the first result bitmap corresponds to a respective first primary key value included in a set of first primary key values associated with the first table;
executing a second portion of the query against a second table included in the database to generate a second result bitmap, wherein each bit of the second result bitmap corresponds to a respective second primary key value included in a set of second primary key values associated with the second table;
modifying the second result bitmap based on a bit-slice index associated with the second table to generate a third result bitmap, wherein each bit of the third result bitmap corresponds to one of the first primary key values included in the set of first primary key values, and wherein modifying the second result bitmap comprises transforming, within each data record of the second result bitmap for which a binary bit is set, one of the second primary key values associated with the data record to one of the first primary key values included in the set of first primary key values; and
generating at least one query result based on the first result bitmap and the third result bitmap.

12. The non-transitory computer-readable medium of claim 11, wherein the first portion of the query corresponds to a first condition, and the first result bitmap indicates one or more data records included in the first table that meet the first condition.

13. The non-transitory computer-readable medium of claim 11, wherein the second portion of the query corresponds to a second condition, and the second result bitmap indicates one or more data records included in the second table that meet the second condition.

14. The non-transitory computer-readable medium of claim 11, wherein a third portion of the query indicates that a JOIN operation should be performed between one or more data records extracted from the first table and one or more data records extracted from the second table.

15. The non-transitory computer-readable medium of claim 11, wherein the bit-slice index comprises a mapping from the set of second primary key values to the set of first primary key values.

16. The non-transitory computer-readable medium of claim 11, wherein the step of modifying the second result bitmap comprises assigning each bit of the second result bitmap a particular first primary key value included in the set of first primary key values.

17. The non-transitory computer-readable medium of claim 11, wherein the step of generating the at least one query result comprises performing an aggregation operation across a combination of the first result bitmap and the second result bitmap.

18. The non-transitory computer-readable medium of claim 11, wherein the step of executing the first portion of the query against the first table comprises scanning the first table to identify one or more data records that meet a condition associated with the first portion of the query.

19. The non-transitory computer-readable medium of claim 11, wherein the step of executing the second portion of the query against the second table comprises scanning the second table to identify one or more data records that meet a condition associated with the second portion of the query.

20. A system, comprising:
a memory storing a software application; and
a processor that, when executing the software application, is configured to perform the steps of:
executing a first portion of the query against a first table included in the database to generate a first result bitmap, wherein each bit of the first result bitmap corresponds to a respective first primary key value included in a set of first primary key values,
executing a second portion of the query against a second table included in the database to generate a second result bitmap, wherein each bit of the second result bitmap corresponds to a respective second primary key value included in a set of second primary key values,
modifying the second result bitmap based on a bit-slice index associated with the second table to generate a third result bitmap, wherein each bit of the third result bitmap corresponds to one of the first primary key values included in the set of first primary key values, and wherein modifying the second result bitmap comprises transforming, within each data record of the second result bitmap for which a binary bit is set, one of the second primary key values associated with the data record to one of the first primary key values included in the set of first primary key values, and
generating at least one query result based on the first result bitmap and the third result bitmap.

* * * * *